United States Patent
Liang et al.

(10) Patent No.: US 8,406,563 B2
(45) Date of Patent: Mar. 26, 2013

(54) PHOTOMETRIC CALIBRATION METHOD AND DEVICE

(75) Inventors: Chia-Kai Liang, Taipei (TW); Homer H. Chen, Taipei (TW); Bing-Yi Wong, Taipei (TW); Gene Liu, Taipei (TW)

(73) Assignee: National Taiwan University, Taipei (TW)

( * ) Notice: Subject to any disclaimer, the term of this patent is extended or adjusted under 35 U.S.C. 154(b) by 907 days.

(21) Appl. No.: 12/510,325

(22) Filed: Jul. 28, 2009

(65) Prior Publication Data

US 2011/0026910 A1 Feb. 3, 2011

(51) Int. Cl.
- G06K 9/40 (2006.01)
- G06K 9/64 (2006.01)
- G09G 1/14 (2006.01)
- G09G 3/28 (2006.01)
- G09G 3/30 (2006.01)
- G09G 5/00 (2006.01)
- G09G 5/10 (2006.01)
- H04N 9/64 (2006.01)
- H04N 5/202 (2006.01)
- H04N 1/40 (2006.01)

(52) U.S. Cl. ........ 382/275; 382/274; 382/278; 250/205; 345/20; 345/63; 345/77; 345/581; 345/596; 345/690; 348/251; 348/254; 358/461

(58) Field of Classification Search .................. None
See application file for complete search history.

(56) References Cited

U.S. PATENT DOCUMENTS

| | | | |
|---|---|---|---|
| 6,476,805 B1 * | 11/2002 | Shum et al. | 345/420 |
| 8,155,456 B2 * | 4/2012 | Babacan et al. | 382/232 |
| 2005/0219264 A1 * | 10/2005 | Shum et al. | 345/629 |
| 2007/0108978 A1 * | 5/2007 | MacFarlane et al. | 324/318 |
| 2007/0252074 A1 * | 11/2007 | Ng et al. | 250/208.1 |
| 2009/0268970 A1 * | 10/2009 | Babacan et al. | 382/232 |
| 2009/0273843 A1 * | 11/2009 | Raskar et al. | 359/601 |

OTHER PUBLICATIONS

Liang et al., ACM SIGGRAPH, "Programmable Aperture Photography: Multiplexed Light Field Aquisition", Aug. 14, 2008, Los Angeles, CA, USA.

* cited by examiner

*Primary Examiner* — Randolph I Chu
(74) *Attorney, Agent, or Firm* — Edwards Wildman Palmer LLP; Peter F. Corless; Steven M. Jensen

(57) ABSTRACT

A photometric calibration method includes: obtaining a target image and a reference image by a light field camera and transforming the reference image into a revised target image corresponding to the target image; calculating a photometric calibration ratio according to a function for correlating the target image and the revised target image by using a numerical algorithm; and the intensity of the target image is divided by the photometric calibration ratio to obtain a calibrated target image. A light field of a scene is formed by all of the calibrated target image so as to improve the quality of the light field.

20 Claims, 6 Drawing Sheets

PHOTOMETRIC CALIBRATION METHOD AND DEVICE

BACKGROUND OF THE INVENTION

1. Field of the Invention

This invention relates to image processing techniques of a light field, and more particularly, to a photometric calibration method for eliminating the photometric distortion of images of a scene, so as to improve the quality of the light field formed by the images.

2. Description of Related Art

Light field acquisition is of fundamental importance among all aspects of computational photography. A complete 4D light field contains most visual information of a scene and allows various photographic effects to be generated in a physically correct way. The light field is a function that describes the amount of light traveling in every direction through every point in free space.

There are several ways to capture the 4D light field by a light field camera. The simplest method involves using a single moving camera whose position for each exposure is established by a camera gantry, possibly estimated by a structure-from-motion (SMF) algorithm. This method is slow because the position of the camera or the object has to be altered before each exposure and only works well in a controlled environment. The second method captures the dynamic light field by putting numerous cameras into a camera array and each camera can capture a subset of the light field at video-rate. The method involves simultaneously capturing the full 4D dataset by the camera array, which is cumbersome and expensive. The third method involves inserting additional optical elements, such as a microlens array or masks in the camera to avoid the angular integration of the light field.

Nevertheless, the light field captured by the existing light field cameras suffers from a common photometric distortion. The light field images corresponding to the boundary of a aperture of the camera appear very different to that corresponding to the center of the aperture. For example, the vignetting effect that is attributed to the cosine-fourth falloff, the blocking of the lens diaphragm or the hood, lens or light sensor aberrations, etc. A photometric distortion in the image captured by traditional cameras exhibits radially diminishing intensity from the center of the image. In the case of 4D light field, the photometric distortion becomes so complex that the conventional models for representing the distortion in the light field become inadequate. However, the photometric distortion in the 4D light field captured by the light field camera must be eliminated; otherwise, it may obstruct view interpolation and depth estimation and thereby render the captured images of the scene less effective. Existing photometric calibration methods generally make two assumptions. First, the scene points have multiple registered observations with different levels of distortions. Second, a vignetting center is valid in most traditional camera, where the optics and the sensors are symmetric along the optical path. Some recent methods remove the first assumption be exploiting the edge and gradient priors in natural images, but the second assumption is still needed. Both assumptions are inappropriate for the light field images because the registration of the light field images taken from different view points requires an accurate per-pixel disparity map that is difficult to obtain from the distorted inputs, and, in each light field image, the vignetting center and other parameters of the vignetting function are image-dependent and coupled. Therefore, estimating the parameters of the vignetting function is an under-determined nonlinear problem.

Accordingly, it is imperative for the light field camera to employ a method of photometric calibration so as to solve the above problems.

SUMMARY OF THE INVENTION

In views of the above-mentioned problems of the prior art, the present invention provides a photometric calibration method, which includes: obtaining a target image and a reference image by a light field camera and transforming the reference image into a revised target image corresponding to the target image; calculating, by a processor, a photometric calibration ratio according to a function for correlating the target image and the revised target image by using a numerical algorithm; and dividing, by the processor, the intensity of the target image by the photometric calibration ratio to obtain a distortion-free image corresponding to the target image.

The step of obtaining a target image and a reference image by an light field camera and transforming the reference image into a revised target image corresponding to the target image further comprises the steps of: (a) obtaining a target image of a scene and a reference image of the scene by a light field camera; (b) detecting target feature points in the target image of the scene and reference feature points in the reference image of the scene by a processor; (c) matching the target features points in the target image with the reference feature points in the reference image of the scene by the processor; (d) constructing a triangular mesh based on the matched target features points in the target image by the processor; (e) determining an affine transform by displacement vectors of three vertices of a target triangle of the triangular mesh by the processor; and (f) warping all target triangles in the triangular mesh by the affine transform to construct the revised target image corresponding to the target image.

The present invention further provides a photometric calibration device for a light field image. The photometric calibration device comprises: a means for obtaining a target image and a reference image; a means for transforming the reference image into a revised target image corresponding to the target image; a means for obtaining a photometric calibration ratio according to a function for correlating the target image and the revised target image; and a means for dividing the intensity of the target image by the photometric calibration ratio to obtain a distortion-free image corresponding to the target image.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

According to the present invention, the photometric calibration method can improve the quality of the light field. By way of the calibration method, the present invention is capable of eliminating the photometric distortion of an image in each subset of light field.

The following illustrative embodiments are provided to illustrate the disclosure of the present invention. These and other advantages and effects can be readily understood by persons skilled in the art after reading the disclosure of this specification. The present invention can also be accomplished or applied by differing embodiments. The details of the specification are based on particular points and applications, but numerous modifications and variations of the embodiments of the present invention can be devised without departing from the spirit of the present invention.

A photometric calibration method 100 of the present invention comprises the steps of: obtaining a target image and a reference image by a light field camera and transforming the reference image into a revised target image corresponding to the target image; calculating, by a processor, a photometric calibration ratio according to a function for correlating the target image and the revised target image; and dividing, by the processor, the intensity of the target image by the photometric calibration ratio to obtain a distortion-free image corresponding to the target image.

Figure 1:
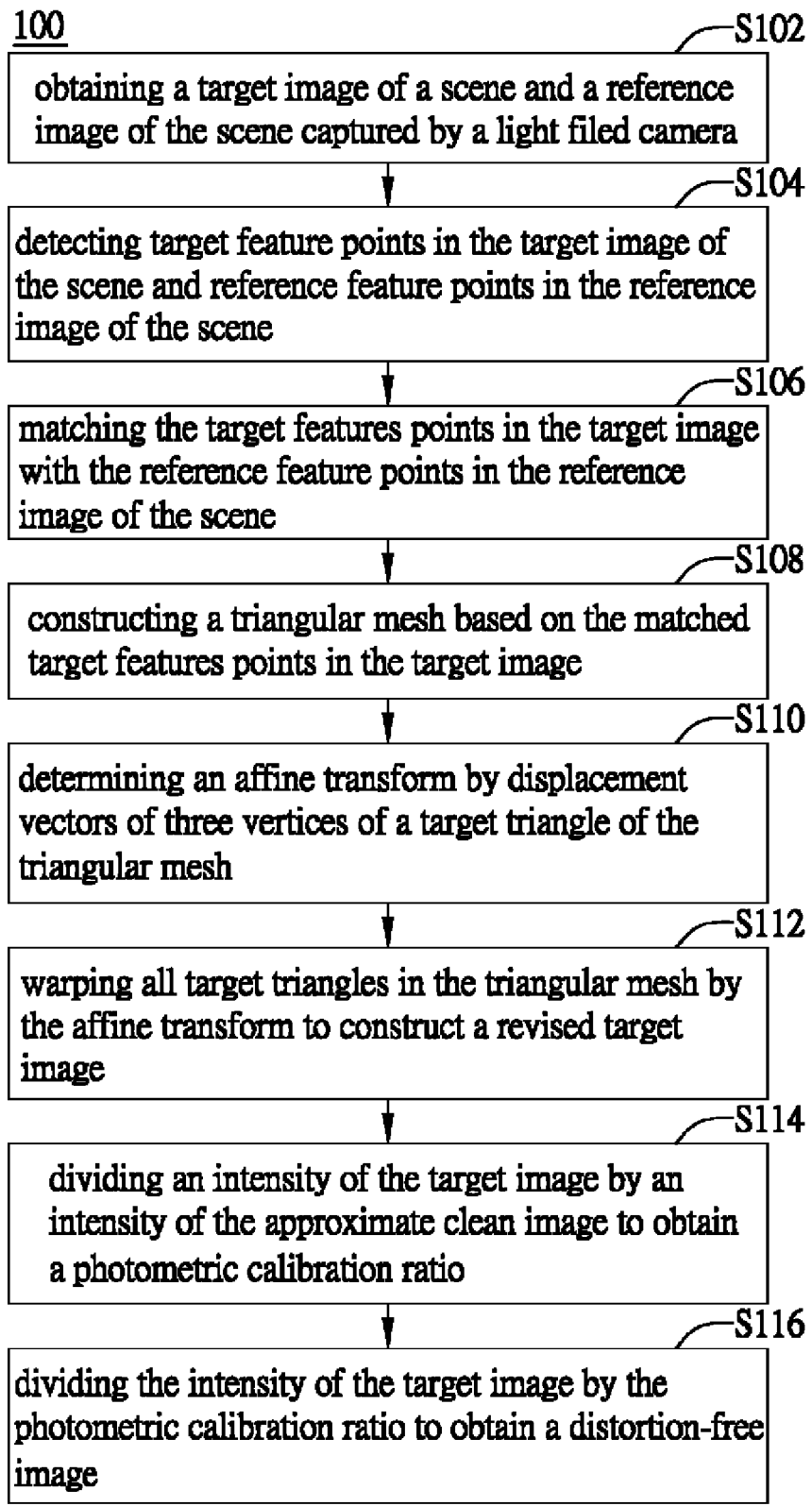
FIG. 1 is a flow chart of a photometric calibration method comprising steps S102 through step S116 in an embodiment of the present invention.

FIG. 1 is a flow chart of the photometric calibration method 100 in an embodiment of the present invention. In step S102, the photometric calibration method 100 comprises obtaining a target image of a scene and a reference image of the scene by a light field camera. The target image and the reference image of the scene are captured at different exposures or the same exposure with different apertures programmed in the light field camera. Both of the images can either cover a portion or an entire area of the scene with different viewpoints. Next, in step S104, target feature points in the target image of the scene and reference feature points in the reference image of the scene are detected by a processor. The processor is a processing unit independently operating as an IC chip or embedded in a system used in a camera, which can be a still camera, a video camera, a web camera, or any type of light-field capturing device. In an embodiment according to the present invention, the target feature points of the target image are detected by a scale-invariant feature transform (SIFT) method.

In step S106, the target features points in the target image are matched with the reference feature points in the reference image of the scene by the processor. In step S108, a triangular mesh is constructed based on the matched target features points in the target image by the processor. Next, in step S110, an affine transform is determined by displacement vectors of three vertices of a target triangle of the triangular mesh by the processor. In step S112, all target triangles in the triangular mesh are affinely warped to construct a revised target image by the processor. The revised target image is deem an approximately clean image corresponding to the target image.

Further, in step S114, calculating a photometric calibration ratio according to a function for correlating the target image and the revised target image by the processor. In step S116, the intensity of the target image is divided by the photometric calibration ratio to obtain a distortion-free target image by the processor. The embodiment of the present invention is applicable to calibration of the distortions of the existing programmable aperture cameras for capturing a light field.

Figure 2:
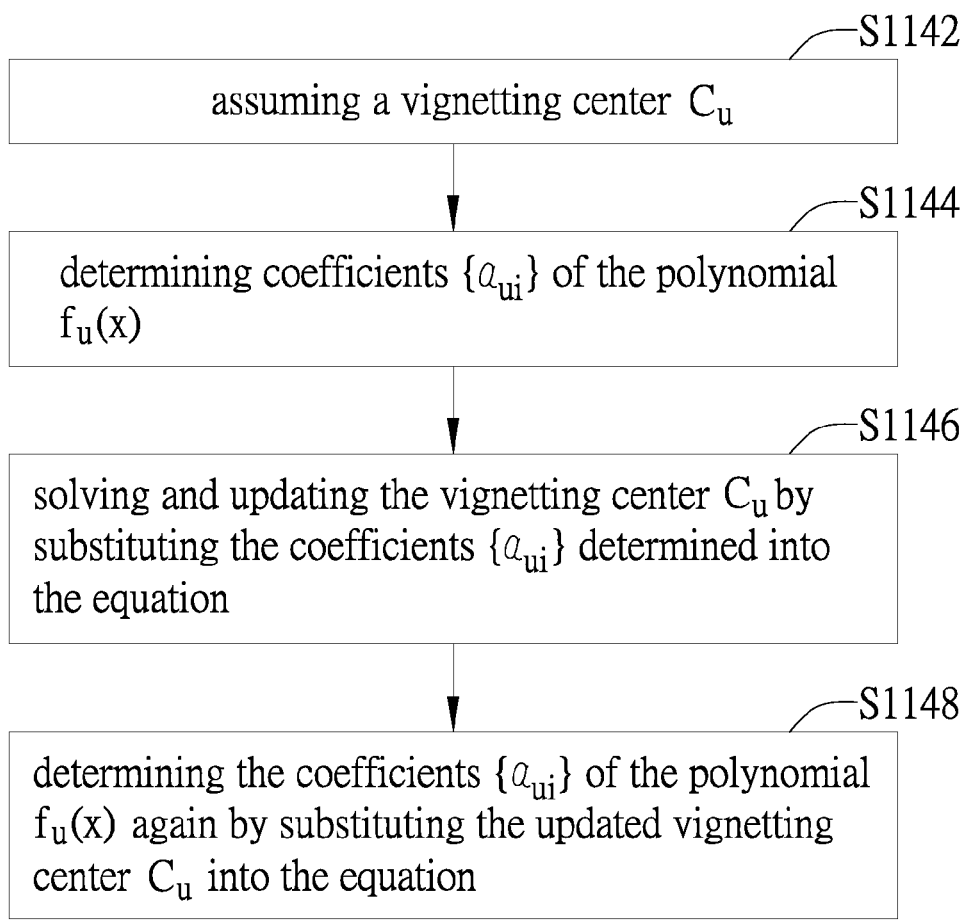
FIG. 2 is a flow chart showing that step S114 is further divided into four sub-steps in the embodiment of the present invention.

To optimize the calculation of the photometric calibration ratios obtained in step S114 of the photometric calibration method 100, step S114 in an embodiment of the present invention is divided into four sub-steps S1142 through S1148, as shown in FIG. 2. In general, a simplified model that describes the correlation between photometric calibration ratios, target intensity, remaining intensity, and reference intensity is adopted and expressed by the $$I_u^d(x) = f_u(x)I_u(x) = \sum_{i=0}^{D-1} a_{ui}\|x - c_u\|_2^{2i} I_u(x),$$

following equation: where $f_u(x)$ represents the photometric calibration ratios, $c_u$ is a vignetting center, $I_u^d(x)$ is the target intensity or the remaining intensity, $I_u(x)$ is the reference intensity, D is any integer greater than one, and $\|\cdot\|_2$ is the Euclidean distance. It is proposed that the light field image closer to the center of the optical path has less distortion. Therefore, $I_u(x)$ is deemed the intensity of an clean image, and then $I_u^d(x)$ is approximated by the intensity of the clean image $I_u(x)$ to estimate vignetting fields. The function $f_u(x)$ is large when the distance between x and $c_u$ is small and gradually decreases as the distance increases.

According to the model, step S114 of the photometric calibration method 100 further comprises the following steps: assuming the vignetting center $c_u$ (step S1142); determining coefficients $\{a_{ui}\}$ of the polynomial $f_u(x)$ (step S1144); solving and updating the vignetting center $c_u$ by substituting the coefficients $\{a_{ui}\}$ determined into the equation (step S1146); and determining the coefficients $\{at_{ui}\}$ of the polynomial $f_u(x)$ again by substituting the updated vignetting center $c_u$ into the equation (step S1148).

The photometric calibration ratios, i.e., the polynomial $f_u(x)$, thus generated are used to calibrate the target image and the remaining images to be images as if they were captured by the light field camera with the reference aperture. In an embodiment of the present invention, steps S1146 and S1148 can be performed iteratively, so as to further optimize the calculation of the photometric calibration ratios. In an embodiment of the present invention, the coefficients $\{a_{ui}\}$ of the polynomial $f_u(x)$ in step S1144 are determined by a least square estimation technique. In an embodiment of the present invention, in step S1146, the vignetting center $c_u$ is solved and updated by a gradient descent technique.

In one embodiment according to the present invention, after having the approximation of the vignetting fields, the equation $$I_u^d(x) = f_u(x)I_u(x) = \sum_{i=0}^{D-1} a_{ui}\|x - c_u\|_2^{2i} I_u(x)$$

are estimated by minimizing an objective function $E(\{a_{ui}\}, C_u)$. This objective function E is non-linear because $\{a_{ui}\}$ and $c_u$ are coupled. Therefore, there is a need to minimize the objective function iteratively. First, fixing the vignetting center $c_u$. This makes the objective function linear in $\{a_{ui}\}$, which can be easily solved by a least square estimation. Then, fixing $\{a_{ui}\}$ and updating $c_u$. This is done by a gradient descent method. It is necessary to find a displacement $\Delta$ such that $E(\{a_{ui}\}, C_u+\Delta)$ is minimized. Specifically, $r_u$ denotes the distance between x and $c_u$, the vector $r=[r_1, r_2, \ldots r_N]^T$ denote the distances between all points x and $c_u$. The vignetting function $f_u(x)$ can be re-defined as a vector function $f(c_u)=[f_u(x_1), f_u(x_2), \ldots, f_u(x_N)]^T$ according to the only variable vignetting center $c_u$. Then the optimal displacement $\Delta$ at iteration t can be obtained by solving the normal equation: $J^T J \Delta = \epsilon^T$, where J is the Jacobian matrix and $\epsilon_{t-1}$ is the error vector of the previous iteration. Note that the Jacobian matrix is evaluated using the vignetting center obtained in the previous iteration and the coefficients estimated in this iteration. In this numerical manner, the convergence speed of the coefficients is increased.

In another embodiment of the present invention, the triangular mesh in S108 is constructed by the Delaunay triangulation method.

Figure 3:
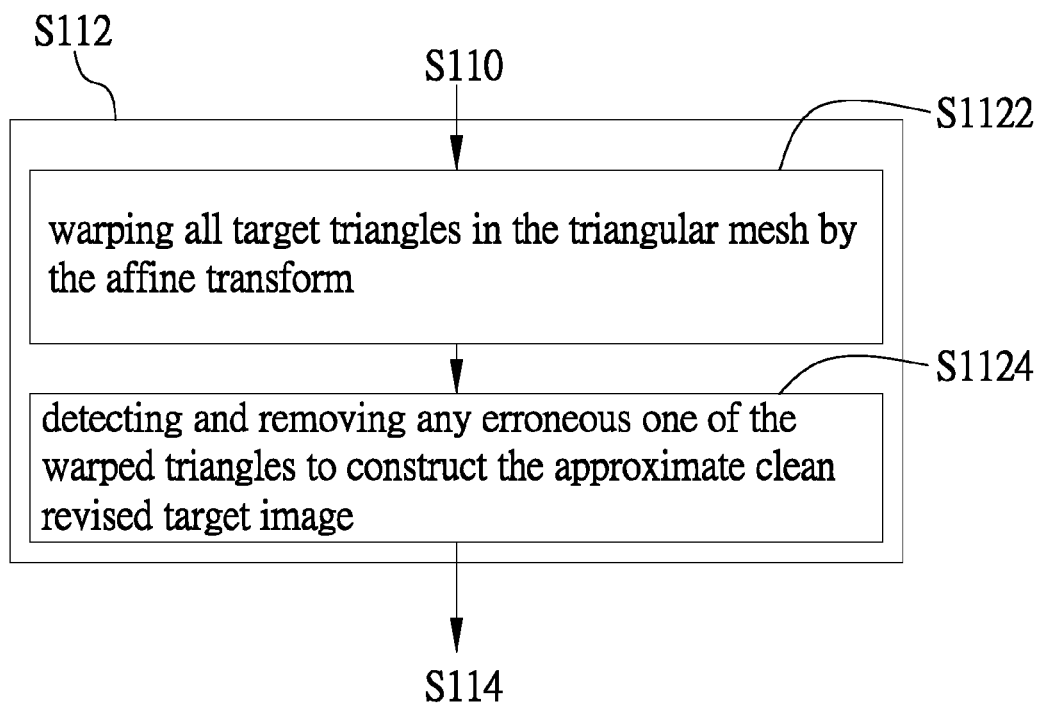
FIG. 3 is a flow chart showing that S112 is further divided into S1122 and S1124 to obtain a revised target image in the embodiment of the present invention.

FIG. 3 is a flowchart that illustrates a preferred embodiment of the present invention.

To obtain an even better approximately clean revised target image, the step S112 is divided into two sub-steps: S1122 and S1124. In step S1122, all target triangles in the triangular mesh are warped by the affine transform. In step S1124, the warped triangles are detected and any erroneous instances of the warped triangles are removed to construct the revised target image. In a preferred embodiment, any erroneous instances of the warped triangles are detected by way of measuring the variance of associated displacement vectors of the erroneous instances of the warped triangles. In another embodiment, the erroneous instances of the warped triangles include triangles that contains objects at different depths or that are incorrectly feature matched. In still another embodiment, the erroneous instances of the warped triangles are detected by measuring the variance of associated displacement vectors of the erroneous instances of the warped triangles.

A photometric calibration device 4 for a light field image according to the present invention comprises: a means for obtaining a target image of a scene and a reference image of the scene; a means for transforming the reference image into a revised target image corresponding to the target image; a means for obtaining a photometric calibration ratio according to a function for correlating the target image and the revised target image by using a numerical algorithm; and a means for dividing the intensity of the target image by the photometric calibration ratio to obtain a distortion-free image corresponding to the target image.

Figure 4:
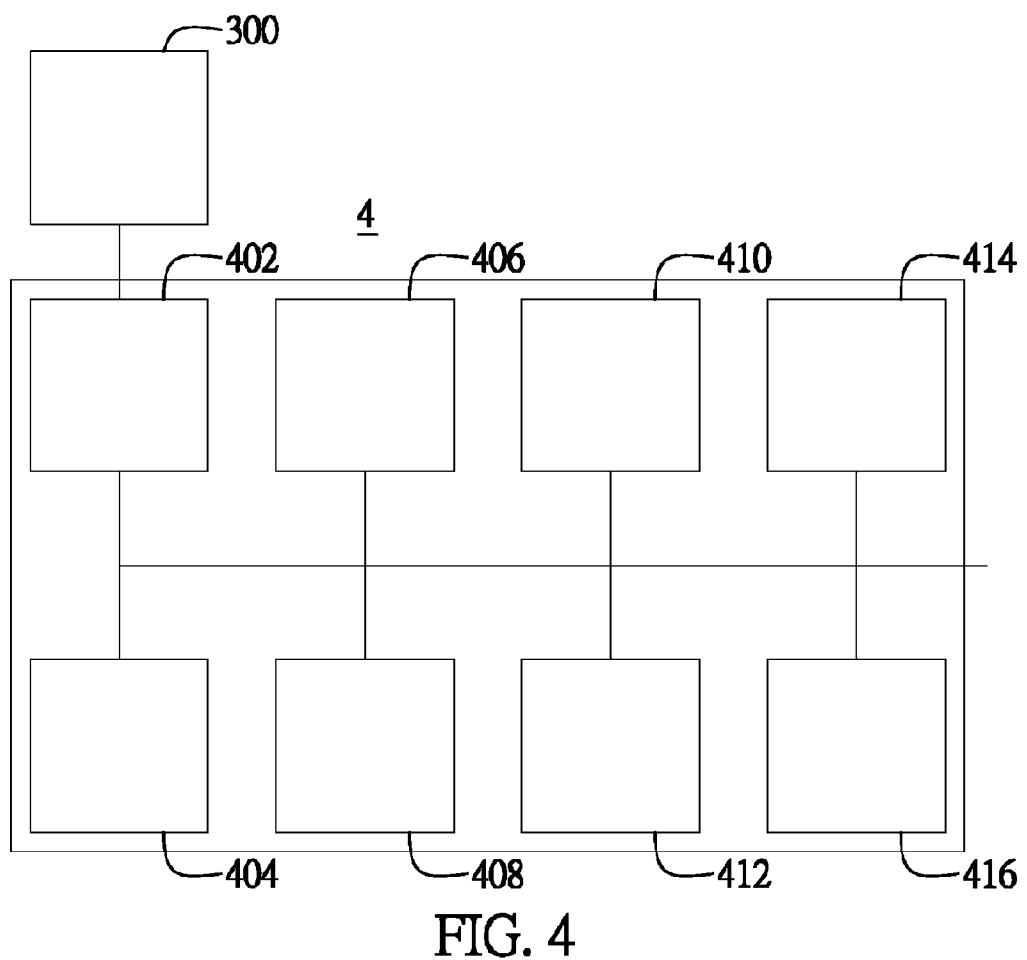
FIG. 4 is a structural block diagram showing a photometric calibration device in an embodiment of the present invention.

FIG. 4 is a structural block diagram showing the photometric calibration device 4 used in an embodiment of the present invention. However, note that the relative positions and sizes of all the means provided in the photometric calibration device 4 do not represent the actual implementation of the manufactured device according to the present invention, for example, a processor/microprocessor or an embedded system.

Referring to FIG. 4, the photometric calibration device 4 further comprises a means 402 for obtaining a target image of a scene and a reference image of the scene. The target image and the reference image can be captured by an external device 300 which is a light field camera, another microprocessor, or a storage medium. The photometric calibration device 4 further comprises a means 404 for detecting target feature points in the target image of the scene and reference feature points in the reference image of the scene.

The photometric calibration device 4 further comprises: a means 406 for matching the target features points in the target image with the reference feature points in the reference image of the scene; a means 408 for constructing a triangular mesh based on the matched target features points in the target image; a means 410 for determining an affine transform by displacement vectors of three vertices of a target triangle of the triangular mesh; a means 412 for warping all target triangles in the triangular mesh by the affine transform to construct an approximately clean revised target image; a means 414 for obtaining a photometric calibration ratio according to a function for correlating the target image and the revised target image by using a numerical algorithm; and a means 416 for obtaining a distortion-free image by way of dividing the target intensity of the target image by the photometric calibration ratio obtained in the means 414.

To optimize the calculation of photometric calibration ratios, an embodiment of the means 414 for obtaining a photometric calibration ratio of the photometric calibration device 4 of the present invention provides a model that describes the photometric calibration ratios between the target intensity and the remaining intensity and the reference intensity as the following equation:

$$I_u^d(x) = f_u(x) I_u(x) = \sum_{i=0}^{D-1} a_{ui} \|x - c_u\|_2^{2i} I_u(x),$$

where $f_u(x)$ represents the photometric calibration ratios, $c_u$ is a vignetting center, $I_u^d(x)$ is the target intensity or the remaining intensity, $I_u(x)$ is the reference intensity, D is any integer greater than one, and $\|\cdot\|_2$ is the Euclidean distance. The function $f_u(x)$ is large when the distance between x and $c_u$ is small and gradually decreases as the distance increases. As shown in FIG. 2, the model comprises assuming the vignetting center $c_u$ (step S1142), determining coefficients $\{a_{ui}\}$ of the polynomial $f_u(x)$ (step S1144), solving and updating the vignetting center $c_u$ by substituting the coefficients $\{a_{ui}\}$ determined into the equation (step S1146), and determining the coefficients $\{a_{ui}\}$ of the polynomial $f_u(x)$ again by substituting the updated vignetting center $c_u$ into the equation (step S1148). The fixing and updating of the vignetting center $c_u$ and the coefficients $\{a_{ui}\}$ can be iterative, if necessary.

The photometric calibration ratios, that is, the polynomial $f_u(x)$, thus generated are used to calibrate the target image and the remaining images such that the calibrated target image and remaining images look as if they were captured by the light field camera with the reference aperture. In an embodiment of the present invention, as described in the steps S1146 and S1148 in FIG. 2, the model can be performed iteratively, so as to further optimize the calculation of the photometric calibration ratios. In an embodiment of the present invention, in the step S1144 of FIG. 2, the coefficients $\{a_{ui}\}$ of the polynomial $f_u(x)$ in the model are determined by a least square estimation technique. In an embodiment of the present invention, as described by the step S1146 in FIG. 2, the vignetting center $c_u$ in the model is solved and updated by a gradient descent technique.

In an embodiment according to the present invention, the means 404 in FIG. 4 detects the target feature points of the target image using a scale-invariant feature transform (SIFT) method.

In one embodiment of the present invention, the means 408 constructs the triangular mesh using the Delaunay triangulation method.

In an embodiment of the present invention, the means 412 further comprises a means for detecting and removing any erroneous instances of the warped triangles warped by the means (not shown) for warping all target triangles in the triangular mesh before the approximately clean revised target image is constructed by the means 412. In a preferred embodiment, any erroneous instances of the warped triangles are detected by way of measuring the variance of associated displacement vectors of the erroneous instances of the warped triangles. In another embodiment, the erroneous instances of the warped triangles include triangles that contains objects at different depths or objects that are incorrectly feature matched. In still another embodiment, the erroneous instances of the warped triangles are detected by measuring the variance of associated displacement vectors of the erroneous instances of the warped triangles.

Figure 5:
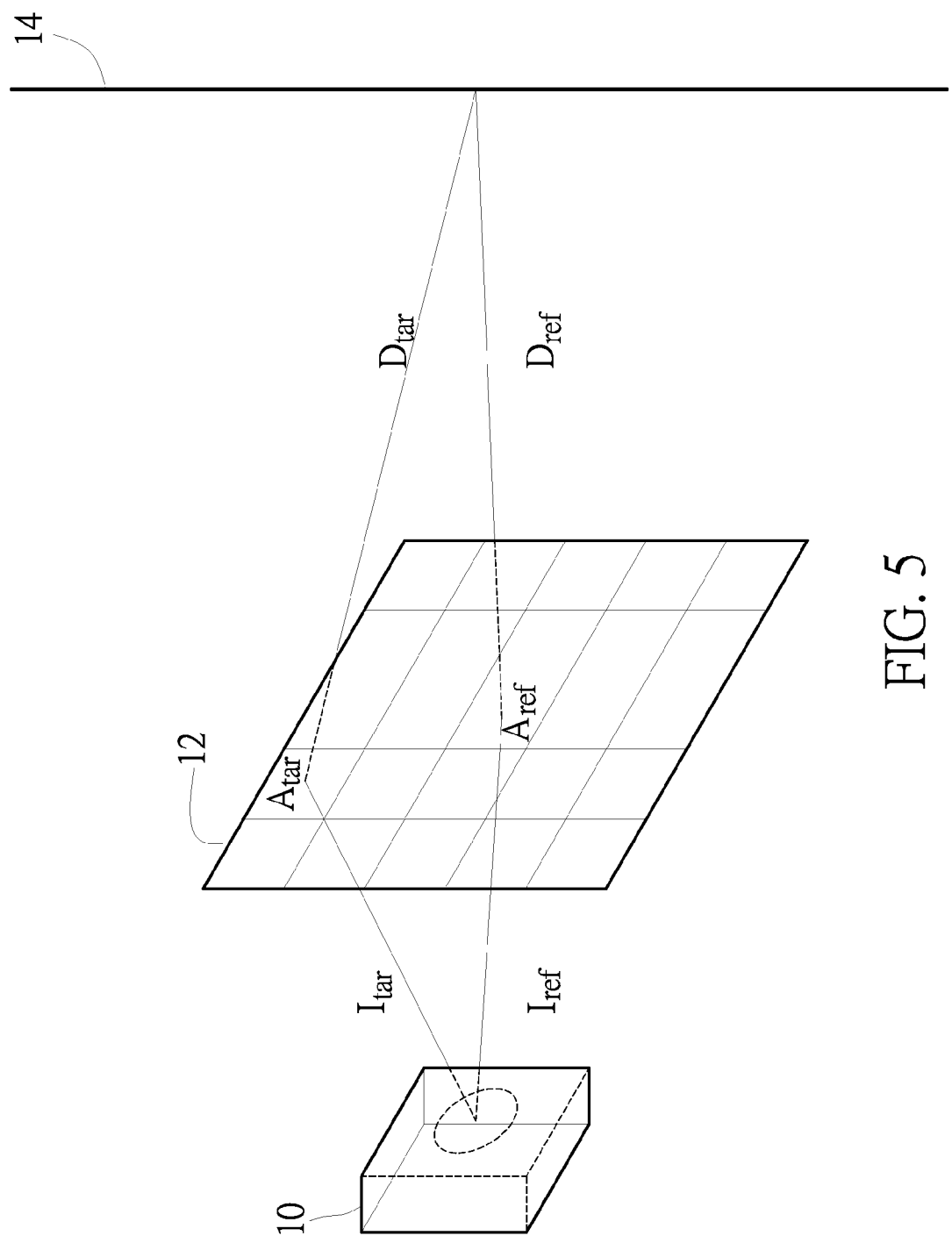
FIG. 5 is a perspective diagram depicting a light field camera used in the present invention.

Referring to FIG. 5, which is a perspective diagram depicting a light field camera 5 used in the present invention, images of a scene 14 are captured from different viewpoints in order for a light field of the scene 14 to be constructed according to the captured images. The light field camera 5 comprises a sensor (or a film) 10 and an aperture 12 made up an array of masks. The aperture 12 includes, for example, a reference aperture $A_{ref}$ located in or near the center of the array, and a target aperture $A_{tar}$ located towards or at the periphery of the array. Accordingly, the reference aperture $A_{ref}$ is at a reference light distance $D_{ref}$ to the center of the scene 14 that is shorter than a target light distance $D_{tar}$ at which the target aperture $A_{tar}$ is located from the center of the scene 14. In operation, the sensor 10 captures a reference image $I_{ref}$ and a target image $I_{tar}$ of the scene 14, with the target aperture $A_{tar}$ and the reference aperture $A_{ref}$ respectively. The captured images of the scene 14 (including the reference image $I_{ref}$ the target image $I_{tar}$ and remaining images captured by the sensor 10 with the remaining apertures in the array 12) are combined to form the light field of the scene 14.

In photography and optics, the sensor 10 is susceptible to the vignetting effect, that is, a reduction in intensity of an image at the periphery compared to the center. The vignetting effect causes a point of the scene 14 to have different levels of intensity in the images (e.g., the reference image $I_{ref}$ and the target image $I_{tar}$) captured by the sensor 14. The vignetting effect thus introduces photometric distortion to the light field of the scene 14, and, as mentioned above, the photometric distortion must be removed, or it can interfere with view interpolation of the scene 14.

In the embodiment described above, the reference intensity of the reference image $I_{ref}$ captured by the sensor 10 with the reference aperture $A_{ref}$ located in the center of the array is used as a basis for calculation of the photometric calibration ratios of the target image $I_{tar}$. However, in another embodiment of the present invention, another intensity of an image can be selected as the basis, as long as the image is captured by the sensor 10 with an aperture at a light distance from the scene 14 shorter than the target light distance $D_{tar}$, (that is, the image suffers less photometric distortion than the target image $I_{tar}$. Preferably, the aperture is located substantially in a line connecting the target aperture $A_{tar}$ and the center of the array, or located substantially in the center of the array.

In an embodiment of the present invention, the photometric calibration method 100 begins with obtaining a target image $I_{tar}$ and a reference image $I_{ref}$ of a scene by a light field camera 5. All the other preferred embodiments illustrated above are applicable to this embodiment, in which the target image and the reference image are captured at the same exposure of the light field camera 5 through the target aperture $A_{tar}$ and the reference aperture $A_{ref}$ respectively.

Figure 6:
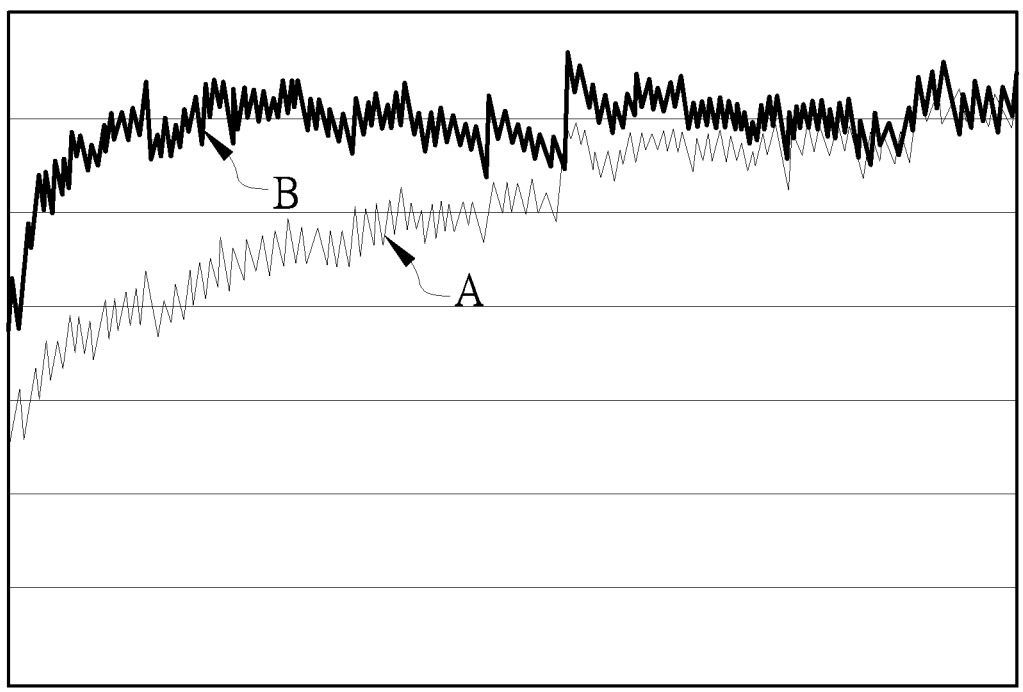
FIG. 6 is an intensity profile of the target image before and after being calibrated by the photometric calibration method of the present invention.

FIG. 6 shows an intensity profile of the target image before (arrow A) and after (arrow B) being calibrated by the photometric calibration method 100 of the present invention. As can be seen, the calibrated target image has a calibrated target intensity that is greatly improved compared with the target intensity of the target image. Therefore, the problem of the prior art in which the light field suffers from photometric distortion is solved by the photometric calibration methods of the present invention.

According to the present invention, the high quality light field is constructed by all of the distortion-free images. It should be emphasized that the light field data captured by all light field cameras have photometric distortion to some degrees. The present invention can be applied to those data as well so as to enables more consistent rendering and more accurate depth estimation based on the calibrated light field data, then finally perform the view-interpolation to re-synthesize the images at the same viewpoint. It is certain that the re-synthesized image is much cleaner than the original one.

The foregoing descriptions of the detailed embodiments are illustrated to disclose the features and functions of the present invention and not intended to be restrictive of the scope of the present invention. It should be understood by those in the art that various modifications and variations made according to the spirit and principles in the disclosure of the present invention fall within the scope of the appended claims.

What is claimed is:

1. A photometric calibration method, comprising the steps of:
   obtaining a target image and a reference image by a light field camera and transforming the reference image into a revised target image corresponding to the target image;
   calculating, by a processor, a photometric calibration ratio according to a function for correlating the target image and the revised target image by using a numerical algorithm; and
   dividing, by the processor, an intensity of the target image by the photometric calibration ratio to obtain a distortion-free image corresponding to the target image.

2. The photometric calibration method of claim 1, wherein the step of obtaining a target image and a reference image by a light field camera and transforming the reference image into a revised target image corresponding to the target image further comprises the steps of:
   (a) obtaining a target image of a scene and a reference image of the scene by a light field camera;
   (b) detecting target feature points in the target image of the scene and reference feature points in the reference image of the scene by a processor;
   (c) matching the target features points in the target image with the reference feature points in the reference image of the scene by the processor;
   (d) constructing a triangular mesh based on the matched target features points in the target image by the processor;
   (e) determining an affine transform by displacement vectors of three vertices of a target triangle of the triangular mesh by the processor; and
   (f) warping all target triangles in the triangular mesh by the affine transform to construct the revised target image corresponding to the target image by the processor.

3. The photometric calibration method of claim 1, wherein the step of calculating a photometric calibration ratio according to a function for correlating the target image and the revised target image by using a numerical algorithm further comprises:
   assuming a vignetting center $c_u$;
   determining coefficients $\{a_{ui}\}$ of a polynomial $f_u(x)$ that represents the photometric calibration ratio, where $I_u^d$ (x) is the product of $f_u(x)$ and $I_u(x)$, $I_u^d(x)$ is the intensity of the target image, and $I_u(x)$ is the intensity of the revised target image;

solving and updating the vignetting center $c_u$ by substituting the coefficients $\{a_{ui}\}$; and determining the coefficients $\{a_{ui}\}$ of the polynomial $f_u(x)$ again by substituting the updated vignetting center $c_u$, wherein the fixing and updating of the vignetting center and the coefficients $\{a_{ui}\}$ can be iterative, if necessary.

4. The photometric calibration method of claim 3, wherein the coefficients $\{a_{ui}\}$ of the polynomial $f_u(x)$ are determined by a least square estimation technique.

5. The photometric calibration method of claim 3, wherein the vignetting center $c_u$ is solved and updated by a gradient descent technique.

6. The photometric calibration method of claim 2, wherein the target image of the scene and the reference image of the scene are captured by a camera with a target aperture at a target light distance from the scene and at a reference light distance shorter than the target light distance from the scene, respectively.

7. The photometric calibration method of claim 2, wherein step (b) is performed by a scale-invariant feature transform (SIFT) method.

8. The photometric calibration method of claim 2, wherein the triangular mesh in step (e) are constructed by the Delaunay triangulation method.

9. The photometric calibration method of claim 2, further comprising, in step (f), detecting and removing any erroneous instances of the warped triangles and thereby constructing the revised target image, wherein the erroneous instances of the warped triangles are detected by measuring the variance of associated displacement vectors of the erroneous instances of the warped triangles.

10. The photometric calibration method of claim 9, wherein the any erroneous instances of the warped triangles include triangles containing objects at different depths or objects that are incorrectly feature matched.

11. The photometric calibration method of claim 6, wherein a reference aperture and the target aperture are selected from a plurality of apertures arranged in an array and the reference aperture is located substantially in the center of the array.

12. A photometric calibration device for a light field image, comprising:

a means for obtaining a target image of a scene and a reference image of the scene;

a means for transforming the reference image into a revised target image corresponding to the target image;

a means for obtaining a photometric calibration ratio according to a function for correlating the target image and the revised target image by using a numerical algorithm; and a means for dividing the intensity of the target image by the photometric calibration ratio to obtain a distortion-free image corresponding to the target image.

13. The photometric calibration device of claim 12 further comprises:

a means for obtaining a target image of a scene and a reference image of the scene;

a means for detecting target feature points in the target image of the scene and reference feature points in the reference image of the scene;

a means for matching the target features points in the target image with the reference feature points in the reference image of the scene;

a means for constructing a triangular mesh based on the matched target features points in the target image;

a means for determining an affine transform by displacement vectors of three vertices of a target triangle of the triangular mesh; and a means for warping all target triangles in the triangular mesh by the affine transform to construct the revised target image corresponding to the target image.

14. The photometric calibration device of claim 13, wherein the obtaining of the photometric calibration ratio is performed by the steps of:

assuming a vignetting center $c_u$;

determining coefficients $\{a_{ui}\}$ of a polynomial $f_u(x)$ that represents the photometric calibration ratio, where $I_u^d(x)$ is the product of $f_u(x)$ and $I_u(x)$, $I_u^d(x)$ is the intensity of the target image, and $I_u(x)$ is the intensity of the revised target image;

updating the vignetting center $c_u$ by substituting the coefficients $\{a_{ui}\}$; and determining the coefficients $\{a_{ui}\}$ of the polynomial $f_u(x)$ again by substituting the updated vignetting center $c_u$, wherein the fixing and updating of the vignetting center and the coefficients $\{a_{ui}\}$ can be iterative, if necessary.

15. The photometric calibration device of claim 13, wherein the target image of the scene and the reference image of the scene are captured by a light field camera with a target aperture at a target light distance from the scene and at a reference light distance shorter than the target light distance from the scene, respectively.

16. The photometric calibration device of claim 13, wherein the detecting of the target feature points and the reference feature points is performed by a scale-invariant feature transform (SIFT) method.

17. The photometric calibration device of claim 13, wherein the target triangles of the triangular mesh are formed by the Delaunay triangulation method.

18. The photometric calibration device of claim 13, further comprising a means for detecting and removing any erroneous instances of the warped triangles warped by the means for warping all the target triangles in the triangular mesh prior to constructing the revised target image, wherein the erroneous instances of the warped triangles are detected by measuring the variance of associated displacement vectors of the erroneous instances of the warped triangles.

19. The photometric calibration device of claim 18, wherein the any erroneous instances of the warped triangles include triangles containing objects at different depths or objects that are incorrectly feature matched.

20. The photometric calibration device of claim 15, wherein a reference aperture and the target aperture are selected from a plurality of apertures arranged in an array.

* * * * *